United States Patent
Ahmann

(10) Patent No.: US 8,123,478 B2
(45) Date of Patent: Feb. 28, 2012

(54) SYSTEMS AND METHODS FOR MONITORING A CONDITION OF A ROTOR BLADE FOR A WIND TURBINE

(75) Inventor: Udo Ahmann, Emsdetten (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/787,767

(22) Filed: May 26, 2010

(65) Prior Publication Data
US 2011/0135475 A1 Jun. 9, 2011

(51) Int. Cl.
*F01D 5/26* (2006.01)
(52) U.S. Cl. ............... 416/1; 416/31; 416/61; 416/500
(58) Field of Classification Search .............. 416/61, 416/31, 500, 1; 415/118, 113, 119
See application file for complete search history.

(56) References Cited

U.S. PATENT DOCUMENTS

| | | | |
|---|---|---|---|
| 7,086,834 B2* | 8/2006 | LeMieux | 416/1 |
| 7,322,794 B2* | 1/2008 | LeMieux et al. | 416/40 |
| 7,360,996 B2* | 4/2008 | Driver | 416/226 |
| 7,854,589 B2* | 12/2010 | Nielsen et al. | 416/1 |
| 2004/0151578 A1 | 8/2004 | Wobben | |
| 2005/0276696 A1 | 12/2005 | LeMieux | |
| 2008/0069693 A1* | 3/2008 | Malakhova et al. | 416/61 |
| 2008/0206052 A1* | 8/2008 | Volkmer | 416/61 |
| 2009/0110539 A1 | 4/2009 | Uphues | |
| 2009/0169378 A1* | 7/2009 | Menke | 416/1 |
| 2009/0185901 A1* | 7/2009 | Nielsen et al. | 416/1 |
| 2009/0232635 A1* | 9/2009 | Menke | 415/17 |
| 2009/0246019 A1 | 10/2009 | Volanthen et al. | |
| 2009/0259429 A1* | 10/2009 | Elisiussen | 702/113 |
| 2010/0074749 A1* | 3/2010 | Garrido et al. | 416/31 |
| 2010/0111695 A1 | 5/2010 | Klausmann et al. | |
| 2010/0119370 A1* | 5/2010 | Myhr | 416/39 |
| 2010/0124498 A1* | 5/2010 | Kabatzke et al. | 416/61 |
| 2010/0135798 A1* | 6/2010 | Eggleston | 416/36 |

FOREIGN PATENT DOCUMENTS

WO 9936695 7/1999
WO 2007131489 A1 11/2007

* cited by examiner

*Primary Examiner* — Edward Look
*Assistant Examiner* — Aaron R Eastman
(74) *Attorney, Agent, or Firm* — James McGinness, Esq.; Armstrong Teasdale LLP

(57) ABSTRACT

A method for monitoring a condition of a rotor blade of a wind turbine is provided. The method includes transmitting, from a sensor to a controller, at least one monitoring signal indicative of a vibration of the rotor blade. The condition of the rotor blade is calculated by the controller based on the monitoring signal.

20 Claims, 7 Drawing Sheets

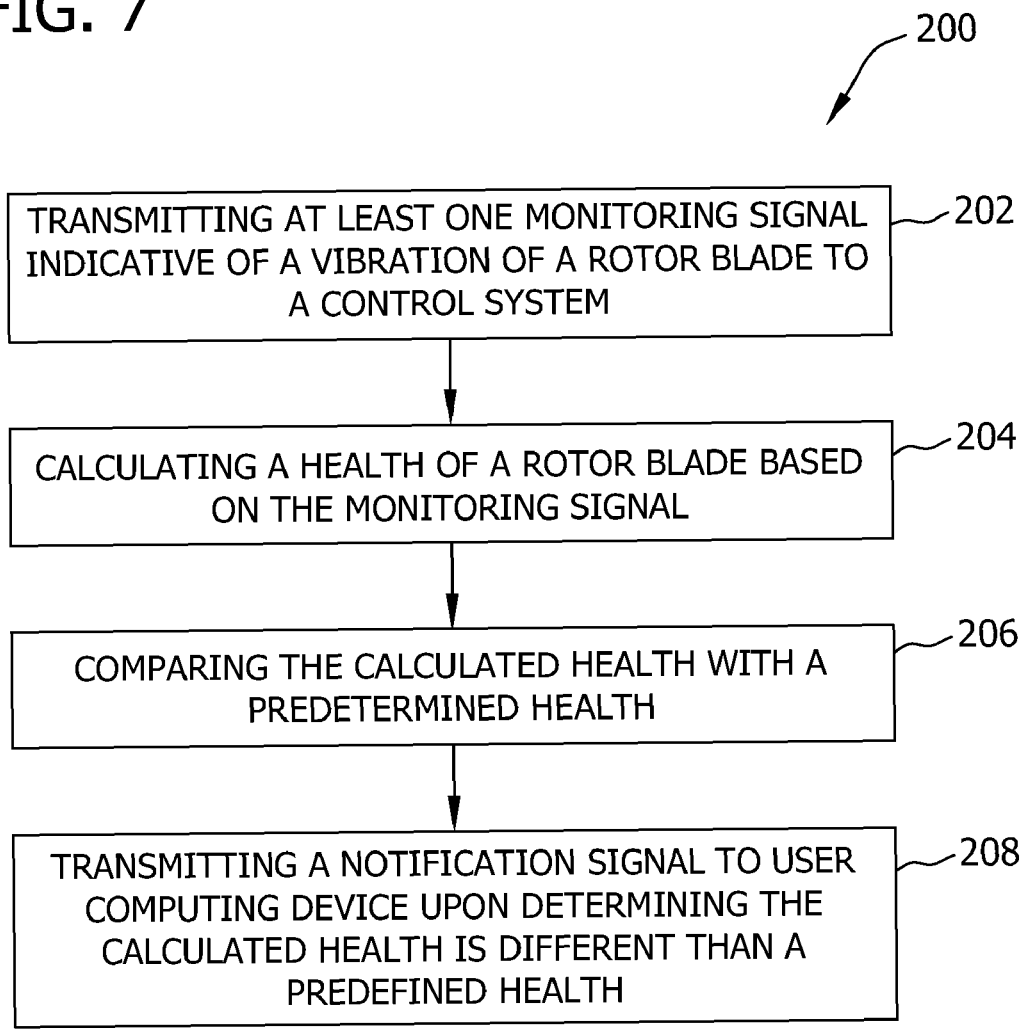

SYSTEMS AND METHODS FOR MONITORING A CONDITION OF A ROTOR BLADE FOR A WIND TURBINE

BACKGROUND OF THE INVENTION

The subject matter described herein relates generally to systems and methods for monitoring a condition of a wind turbine, and more particularly, to a wind turbine that includes a rotor blade condition monitoring system configured to monitor a condition of a rotor blade.

Because many known wind turbines provide electrical power to utility grids, at least some wind turbines have larger components (e.g., rotors in excess of thirty-meters in diameter) that facilitate supplying greater quantities of electrical power. However, the larger components are often subjected to increased loads (e.g., asymmetric loads) that result from wind shears, yaw misalignment, and/or turbulence, and the increased loads have been known to contribute to significant fatigue cycles on the rotor blades and/or other components of the wind turbine.

At least some known wind turbines include a nacelle fixed atop a tower. The nacelle includes a rotor assembly coupled to a generator through a shaft. In known rotor assemblies, a plurality of rotor blades extend from a rotor. The rotor blades are oriented such that wind passing over the rotor blades turns the rotor and rotates the shaft, thereby driving the generator to generate electricity. Known rotor blades are generally subjected to operational detriments from environmental elements, such as wind shear, extreme temperatures, icing, and general mechanical wear. Moreover, known rotor blades may be subjected to stresses that cause fatigue cracking and/or failure, which may eventually cause suboptimal performance of the wind turbine. Conventional methods for monitoring some known rotor blades include manual inspection, which may be infrequent, expensive, and/or time consuming and introduce undesirable delay and expense before the suboptimal performance can be addressed.

BRIEF DESCRIPTION OF THE INVENTION

In one aspect, a method for monitoring a condition of a rotor blade of a wind turbine is provided. The method includes transmitting, from a sensor to a controller, at least one monitoring signal indicative of a vibration of the rotor blade. The condition of the rotor blade is calculated by the controller based on the monitoring signal.

In another aspect, a rotor blade condition monitoring system for use with a wind turbine is provided. The wind turbine includes at least one rotor blade. The rotor blade condition monitoring system includes at least one sensor that is configured to sense a vibration of the rotor blade and to transmit at least one monitoring signal indicative of the sensed vibration. A controller is communicatively coupled to the sensor for receiving the monitoring signal from the sensor. The controller is configured to determine a condition of the rotor blade based on the received monitoring signal.

In yet another aspect, a wind turbine is provided. The wind turbine includes a tower, a nacelle coupled to the tower, a generator positioned within the nacelle, a rotor, a rotor shaft rotatably coupling the rotor to the generator, at least one rotor blade coupled to the rotor, and a rotor blade condition monitoring system. The rotor blade condition monitoring system includes at least one sensor that is configured to sense a vibration of the rotor blade. The sensor is further configured to transmit at least one monitoring signal indicative of the sensed vibration. A controller is communicatively coupled to the sensor for receiving the monitoring signal from the sensor. The controller is configured to determine a condition of the rotor blade based on the received monitoring signal.

BRIEF DESCRIPTION OF THE DRAWINGS

FIG. 7 is a flow chart illustrating an exemplary method for operating a rotor blade condition monitoring system for use with the wind turbine generator system shown in FIG. 1.

DETAILED DESCRIPTION OF THE INVENTION

The embodiments described herein facilitate monitoring a condition of a rotor blade for a wind turbine. More specifically, the embodiments described herein include a rotor blade condition monitoring system that facilitates determining the condition of the rotor blade. In addition, the rotor blade condition monitoring system facilitates determining the condition of the rotor blade based on a vibration of the rotor blade during operation of the wind turbine. Moreover, the rotor blade condition monitoring system facilitates operating the wind turbine to a safety operation upon determining that the condition of the rotor blade is different than a predefined rotor blade condition.

Figure 1:
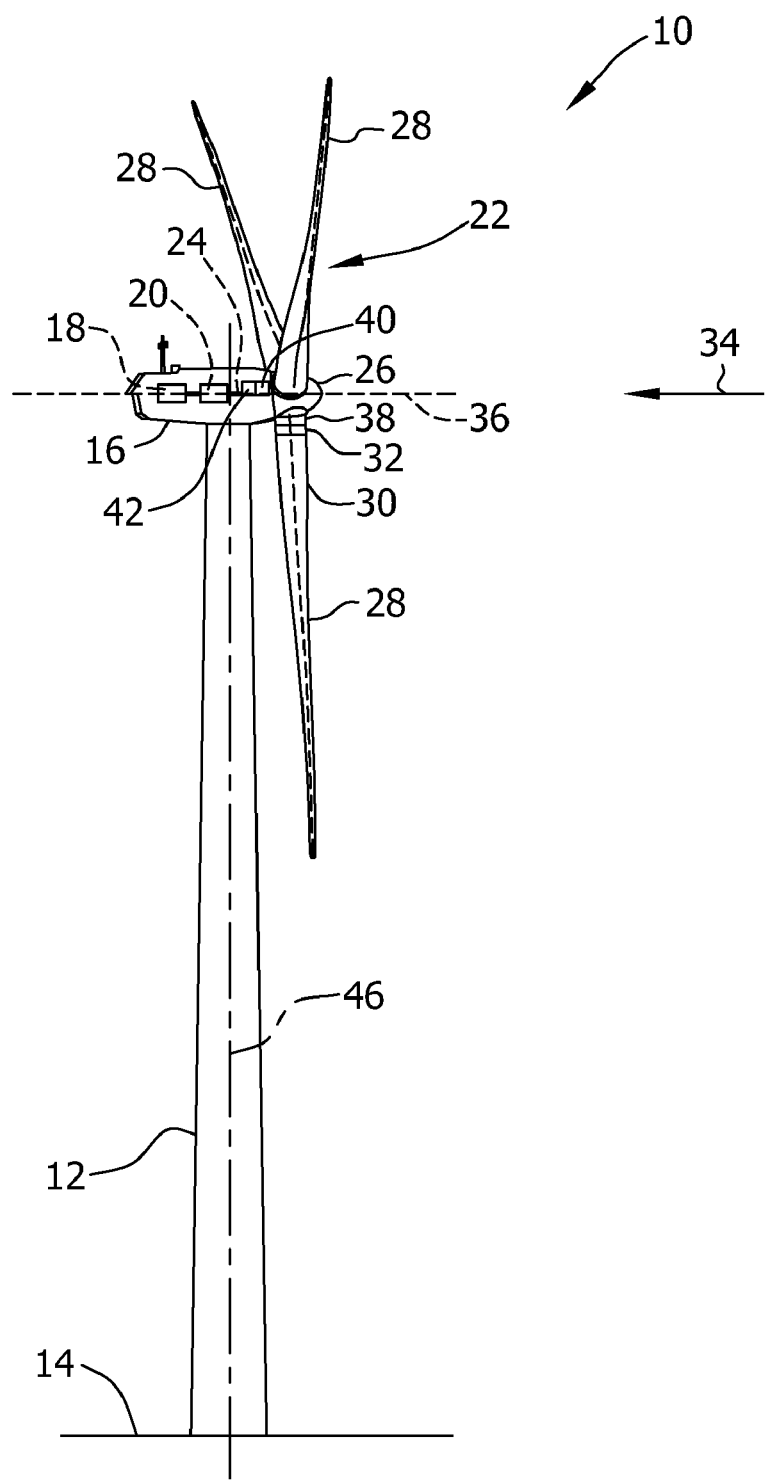
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, a nacelle 16 mounted on tower 12, a generator 18 positioned within nacelle 16, a gearbox 20 coupled to generator 18, and a rotor 22 that is rotatably coupled to gearbox 20 with a rotor shaft 24. Rotor 22 includes a rotatable hub 26 and at least one rotor blade 28 coupled to and extending outwardly from hub 26. Alternatively, wind turbine 10 does not include gearbox 20, such that rotor 22 is coupled to generator 18 via rotor shaft 24.

In the exemplary embodiment, rotor 22 includes three rotor blades 28. In an alternative embodiment, rotor 22 includes more or less than three rotor blades 28. Rotor blades 28 are spaced about hub 26 to facilitate rotating rotor 22 to enable kinetic energy to be transferred from the wind into usable mechanical energy, and subsequently, electrical energy. Rotor blades 28 are mated to hub 26 by coupling a blade root portion 30 to hub 26 at a plurality of load transfer regions 32. Loads induced to rotor blades 28 are transferred to hub 26 via load transfer regions 32. In the exemplary embodiment, each rotor blade 28 has a length ranging from about 30 meters (m) (99 feet (ft)) to about 120 m (394 ft). Alternatively, rotor blades 28 may have any suitable length that enables wind turbine 10 to function as described herein. For example, other non-limiting examples of rotor blade lengths include 10 m or less, 20 m, 37 m, or a length that is greater than 120 m. As wind strikes rotor blades 28 from a direction 34, rotor 22 is rotated about an axis of rotation 36. As rotor blades 28 are rotated and subjected to centrifugal forces, rotor blades 28 are also subjected to various forces and moments. As such, rotor blades 28 may oscillate, deflect and/or rotate from a neutral, or non-deflected, position to a deflected position. Moreover, a pitch angle or blade pitch of each rotor blade 28, i.e., an angle that determines a perspective of rotor blade 28 with respect to direction 34 of the wind, may be changed by a pitch adjustment system 38 to control the oscillation, load, and/or power generated by wind turbine 10 by adjusting an angular position of rotor blade 28 relative to wind vectors. A rotor blade condition monitoring system 40 is positioned within nacelle 16 and operatively coupled to rotor 22, rotor blades 28, hub 26, and/or rotor shaft 24 for monitoring a condition of rotor blades 28. Alternatively, rotor blade condition monitoring system 40 may be operatively coupled to any structural component of wind turbine 10 that may be coupled, directly or indirectly, to rotor blades 28, wherein a vibration from rotor blades 28 may be transferred to the structural component. In the exemplary embodiment, rotor blade condition monitoring system 40 includes a control system 42 that is coupled in operative communication to pitch adjustment system 38 to control a pitch of rotor blades 28. In one embodiment, a pitch angle of each rotor blade 28 is controlled individually by a control system 42. Alternatively, the pitch angle for all rotor blades 28 may be controlled simultaneously by control system 42.

During operation of wind turbine 10, each rotor blade 28 is subjected to various environmental forces, i.e. wind loads and/or rotational loads that cause rotor blade 28 to oscillate and/or generate a vibration. When rotor blade 28 operates at vibration frequencies that are different than predefined rotor blade vibration frequencies, rotor blade 28 may be subjected to increased load stresses and/or fatigue cycles. Over time, the increased load stresses and/or fatigue cycles cause structural cracks and increased mechanical wear in rotor blade 28. The vibration is imparted to hub 26 from rotor blade 28 through a mechanical connection between rotor blade 28 and hub 26. Hub 26 imparts at least a portion of the vibration to nacelle 16 and/or rotor shaft 24 via mechanical connections between hub 26 and nacelle 16 and/or rotor shaft 24. During normal operation, each rotor blade 28 generally operates within a predefined range of vibration frequency values, based on structural characteristics of rotor blade 28 and environmental elements. Over time, as rotor blade 28 is subjected to environmental elements, such as wind shear, extreme temperatures, icing, and general mechanical wear, a structural fatigue and/or a structural crack may develop within rotor blade 28. The structural fatigue and/or the structural crack may cause rotor blade 28 to generate a vibration frequency that is not within the predefined range of vibration frequency values. Rotor blade condition monitoring system 40 is configured to monitor the vibration frequency of rotor blade 28 and to notify an operator when rotor blade 28 is not operating within the predefined range of vibration frequency values. In one embodiment, rotor blade condition monitoring system 40 is configured to operate pitch adjustment system 38 to modulate a pitch angle of rotor blade 28 to facilitate adjusting i.e. to increase or reduce, the vibration frequency such that rotor blade 28 operates within a predefined range of vibration frequency values. Alternatively, rotor blade condition monitoring system 40 is configured to operate pitch adjustment system 38 to change the pitch angle of rotor blade 28 such that rotor blade 28 is moved to a feathered position. In the feathered position, the perspective of rotor blade 28 relative to wind vectors provides a minimal surface area of rotor blade 28 to be oriented towards the wind vectors, which facilitates reducing a rotational speed of rotor 22 and/or facilitates a stall of rotor 22.

Figure 2:
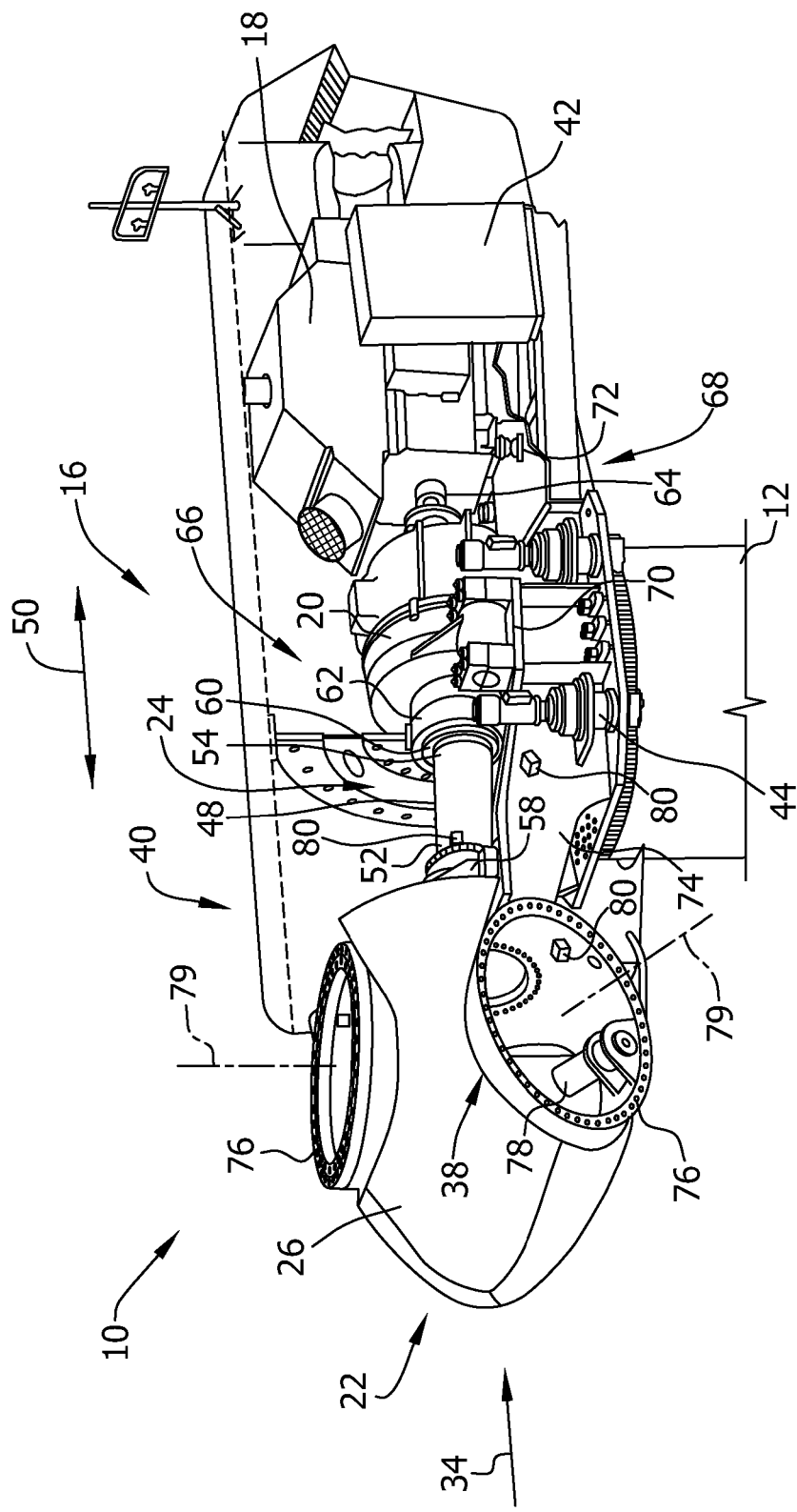
FIG. 2 is an enlarged sectional view of a portion of the wind turbine shown in FIG. 1 that includes an exemplary rotor blade condition monitoring system.
Figure 3:
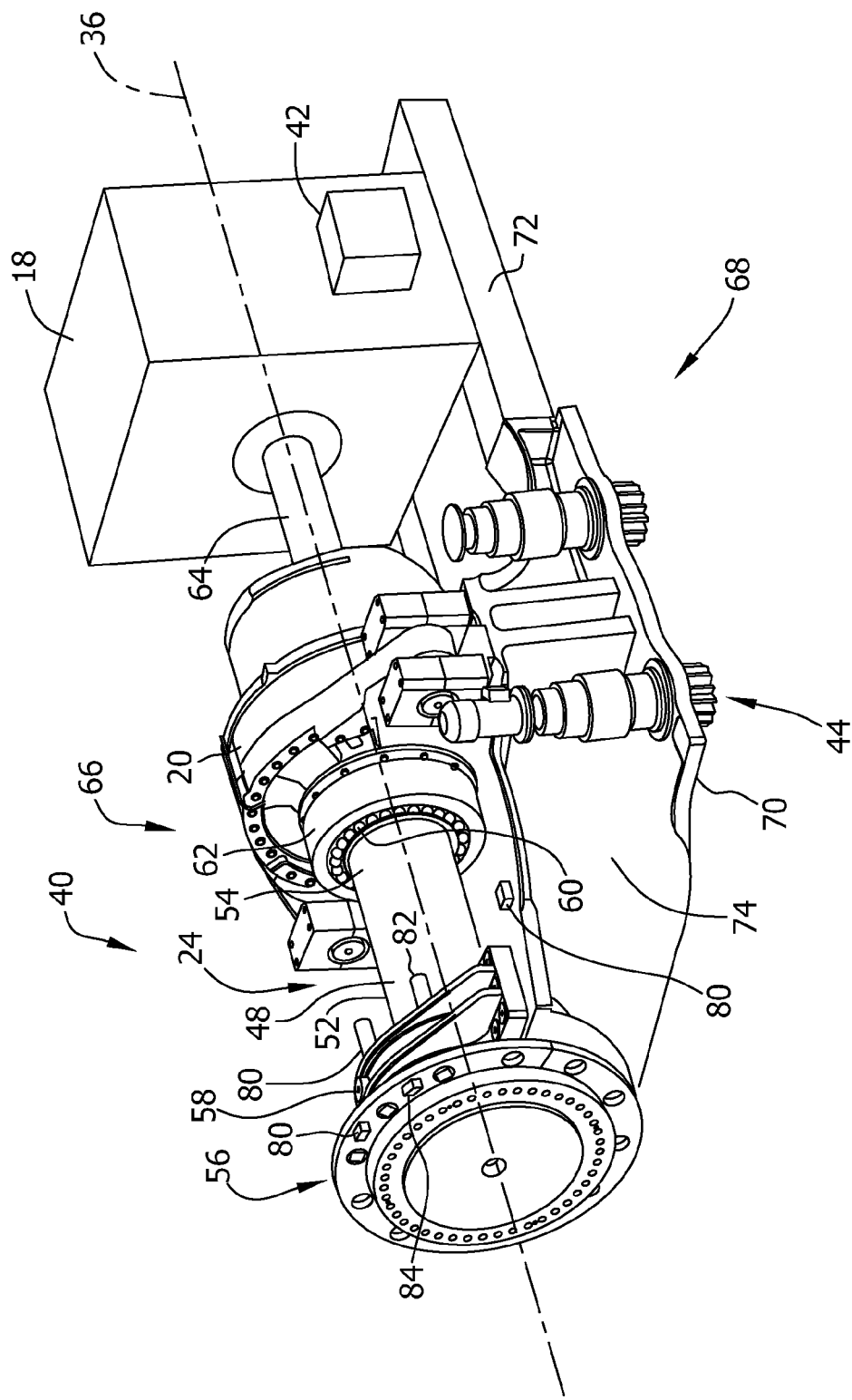
FIG. 3 is a perspective view of an exemplary rotor blade condition monitoring system suitable for use the wind turbine shown in FIG. 1.

FIG. 2 is an enlarged sectional view of a portion of wind turbine 10. FIG. 3 is a perspective view of rotor blade condition monitoring system 40. Identical components shown in FIG. 3 are labeled with the same reference numbers used in FIG. 2. In the exemplary embodiment, nacelle 16 includes rotor shaft 24, gearbox 20, generator 18, and a yaw drive mechanism 44. Yaw drive mechanism 44 facilitates rotating nacelle 16 and hub 26 on yaw axis 46 (shown in FIG. 1) to control the perspective of rotor blade 28 with respect to direction 34 of the wind. Rotor shaft 24 includes a substantially cylindrical body 48 that extends in a longitudinal direction 50 between a first end 52 and an opposite second end 54. First end 52 is coupled to rotor 22. More specifically, rotor shaft 24 includes a rotor flange 56 (shown in FIG. 3) that is fixedly coupled to rotor shaft first end 52. Hub 26 is coupled to rotor flange 56 such that a rotation of hub 26 about axis 36 facilitates rotating rotor shaft 24 about axis 36. A shaft support bearing 58 is coupled to rotor shaft 24 at or near rotor flange 56 to facilitate radial support and alignment of rotor shaft 24. Alternatively, wind turbine 10 may include any number of support bearings that enable wind turbine 10 to function as described herein.

Second end 54 is rotatably coupled to gearbox 20. Gearbox 20 includes an input shaft 60 that is configured to receive second end 54 of rotor shaft 24. A shrink disk 62 is coupled to input shaft 60 and extends radially outwardly from input shaft 60 such that input shaft 60 is between shrink disk 62 and rotor shaft 24. Shrink disk 62 is configured to compress input shaft 60 to facilitate coupling input shaft 60 to rotor shaft 24 via a friction fit. A high speed shaft 64 is coupled between gearbox 20 and generator 18.

During operation of wind turbine 10, a rotation of rotor shaft 24 rotatably drives gearbox 20 that subsequently drives high speed shaft 64. High speed shaft 64 rotatably drives generator 18 to facilitate production of electrical power by generator 18. Rotor shaft 24, generator 18, gearbox 20, high speed shaft 64, and any associated fastening and/or support device including, but not limited to, rotor flange 56 and/or shaft support bearing 58, are sometimes referred to as a drivetrain 66. In the exemplary embodiment, drivetrain 66 is supported by a drivetrain support assembly 68. Drivetrain support assembly 68 includes a bedplate support frame 70 and a generator frame 72 that is cantilevered from bedplate support frame 70. Gearbox 20, rotor shaft 24, and shaft support bearing 58 are each supported by bedplate support frame 70. Generator 18 is supported by generator frame 72.

Shaft support bearing 58 is coupled to a forward section 74 of bedplate support frame 70. Rotor shaft 24 extends through shaft support bearing 58 and is supported by shaft support bearing 58 and gearbox 20. Hub 26 is coupled to rotor shaft 24 such that hub 26 and rotor blade 28 (shown in FIG. 1) are each supported by shaft support bearing 58 and by gearbox 20 via rotor shaft 24.

In the exemplary embodiment, hub 26 includes pitch adjustment system 38. Pitch adjustment system 38 includes at least one pitch bearing 76 and at least one pitch drive 78. Each pitch bearing 76 is coupled to hub 26 and to respective rotor blade 28 (shown in FIG. 1) for supporting respective rotor blade 28 from hub 26 and to rotate respective rotor blade 28 about a pitch axis 79. Each pitch drive 78 is coupled to a respective rotor blade 28 (shown in FIG. 1) for modulating the pitch angle of associated rotor blade 28 along pitch axis 79. In one embodiment, control system 42 is coupled in operative communication with pitch adjustment system 38, and is configured to operate pitch adjustment system 38 to modulate the pitch angle of associated rotor blade 28. Only one of three pitch adjustment system 38 is shown in FIG. 2.

During operation of wind turbine 10, wind strikes rotor blade 28 causing rotor blade 28 to oscillate with respect to rotor 22, thereby generating vibrations within rotor blade 28. The vibrations from rotor blade 28 are imparted to hub 26 from rotor blade 28 through pitch bearing 76. The vibrations from rotor blade 28 are further imparted from hub 26 to rotor shaft 24 and/or shaft support bearing 58 via rotor flange 56. Shaft support bearing 58 further imparts the rotor blade vibrations from shaft support bearing 58 to drivetrain support assembly 68.

In the exemplary embodiment, rotor blade condition monitoring system 40 is coupled to hub 26, drivetrain 66, and/or drivetrain support assembly 68 to facilitate monitoring a condition of rotor blade 28. More specifically, rotor blade condition monitoring system 40 is configured to monitor the vibrations of rotor blade 28 that are imparted from rotor blade 28 to hub 26, drivetrain 66, and/or drivetrain support assembly 68. More specifically, rotor blade condition monitoring system 40 is coupled to rotor flange 56, rotor shaft 24, shaft support bearing 58, and/or bedplate support frame 70 to facilitate monitoring the vibrations of rotor blade 28.

In the exemplary embodiment, rotor blade condition monitoring system 40 includes control system 42 and one or more sensors 80. Sensors 80 are operatively coupled to hub 26, drivetrain 66, and/or drivetrain support assembly 68 for sensing the vibrations of rotor blade 28 imparted to hub 26, drivetrain 66, and/or drivetrain support assembly 68. More specifically, sensors 80 are coupled to rotor flange 56, rotor shaft 24, shaft support bearing 58, and/or bedplate support frame 70. In the exemplary embodiment, sensors 80 are configured to sense a vibration of rotor blade 28 and to transmit at least one monitoring signal indicative of the sensed vibration to control system 42. Control system 42 is configured to determine a condition of rotor blade 28 based, at least in part, on the received signal. Control system 42 is further configured to transmit a notification signal to an operator upon determining that the condition of rotor blade 28 is different than a predefined rotor blade condition.

In one embodiment, control system 42 is configured to calculate an operating vibration frequency value based, at least in part on the sensed vibration. Control system 42 is further configured to calculate a range of operating vibration frequency values based, at least in part on a plurality of sensed vibrations of rotor blade 28 received from sensors 80 over a period of operation of wind turbine 10. The range of operating vibration frequency values includes vibration frequencies wherein rotor blade 28 operates without being subjected to an increase in load stresses and/or fatigue cycles that cause structural cracks and/or increased mechanical wear. In this embodiment, control system 42 is configured to determine that a condition of rotor blade 28 is less than a predefined rotor blade condition upon determining that the sensed vibration frequency is different than the calculated operating vibration frequency value and/or is not within the calculated range of operating vibration frequency values.

In an alternative embodiment, control system 42 is configured to operate pitch adjustment system 38 to modulate a pitch angle of rotor blade 28 upon determining that the condition of the rotor blade is less than a predefined rotor blade condition. Control system 42 operates pitch adjustment system 38 to modulate the pitch angle to facilitate reducing and/or increasing a vibration frequency of rotor blade 28 such that the rotor blade 28 operates within the calculated range of operating vibration frequency values. Alternatively, control system 42 may be configured to rotate rotor blade 28 to a feathered position upon determining that the condition of rotor blade 28 is less than a predefined condition of rotor blade 28 to facilitate a stall of rotor 22.

In the exemplary embodiment, sensors 80 include a proximity sensor 82 or an acceleration sensor 84. Alternatively, sensors 80 may include any sensor that enables rotor blade condition monitoring system 40 to function as described herein. In one embodiment, at least one sensor 80 is coupled to an inner surface 86 of hub 26 and is configured to sense a seismic acceleration of hub 26 that is caused by the vibrations of rotor blade 28 imparted to hub 26 from rotor blade 28. In an alternative embodiment, sensor 80 is coupled to rotor flange 56 and is configured to sense a seismic acceleration of rotor flange 56 that is caused by the vibrations imparted to rotor flange 56 from rotor blade 28 through hub 26. Alternatively, sensor 80 may be coupled to shaft support bearing 58 for sensing a vibration of rotor blade 28 imparted to shaft support bearing 58 from rotor blade 28. In one embodiment, sensors 80 are coupled to shaft support bearing 58 and/or bedplate support frame 70, and are positioned adjacent rotor shaft 24 for sensing a change in a distance between rotor shaft 24 and sensors 80 as rotor shaft 24 is rotated about axis 36.

Figure 4:
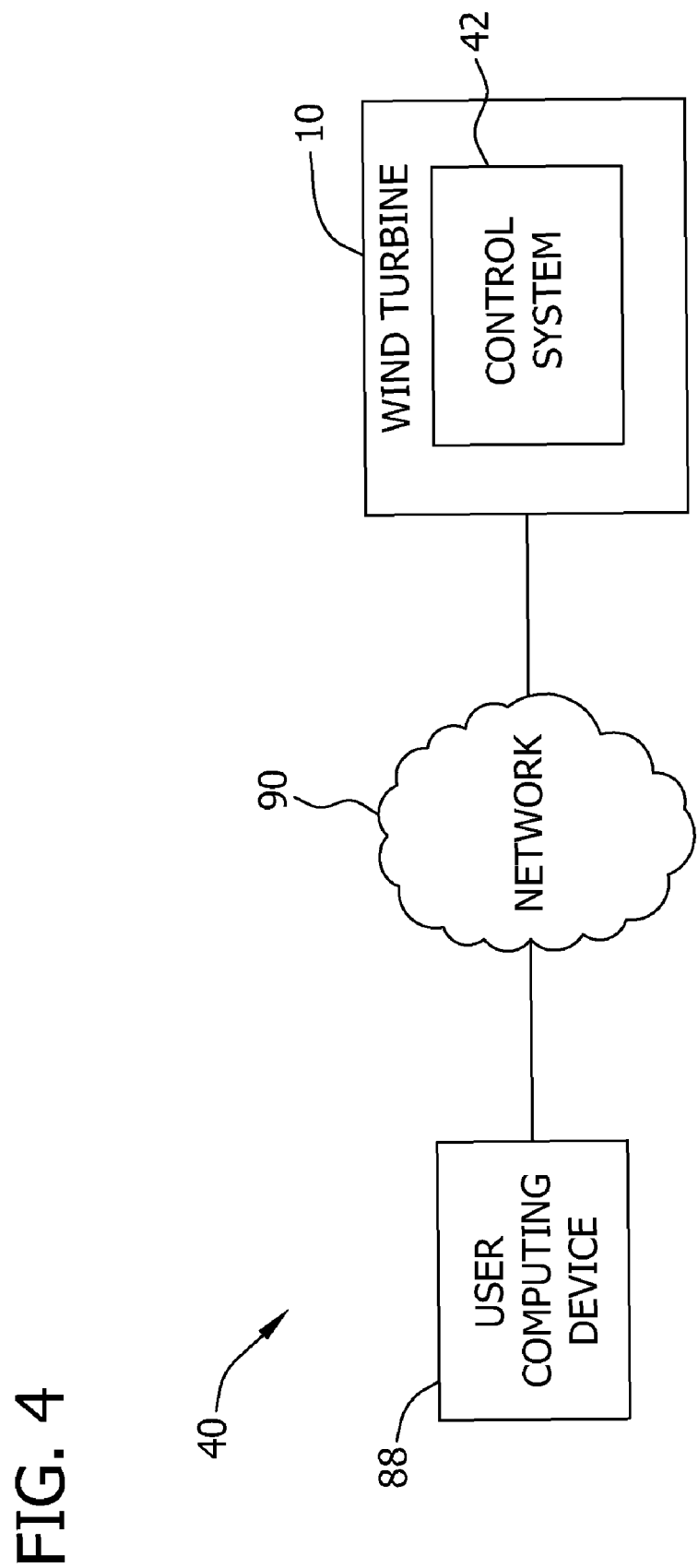
FIG. 4 is a block diagram illustrating an exemplary rotor blade condition monitoring system suitable for monitoring the wind turbine shown in FIG. 1.

FIG. 4 is a block diagram illustrating an exemplary rotor blade condition monitoring system 40. In the exemplary embodiment, rotor blade condition monitoring system 40 includes a user computing device 88 coupled to control system 42 via network 90. For example, network 90 may include, without limitation, the Internet, a local area network (LAN), a wide area network (WAN), a wireless LAN (WLAN), a mesh network, and/or a virtual private network (VPN). User computing device 88 and control system 42 communicate with each other and/or network 90 using a wired network connection (e.g., Ethernet or an optical fiber), a wireless communication means, such as radio frequency (RF), an Institute of Electrical and Electronics Engineers (IEEE) 802.11 standard (e.g., 802.11(g) or 802.11(n)), the Worldwide Interoperability for Microwave Access (WIMAX) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of Institute of Electrical and Electronics Engineers, Inc., of New York, N.Y.

Figure 5:
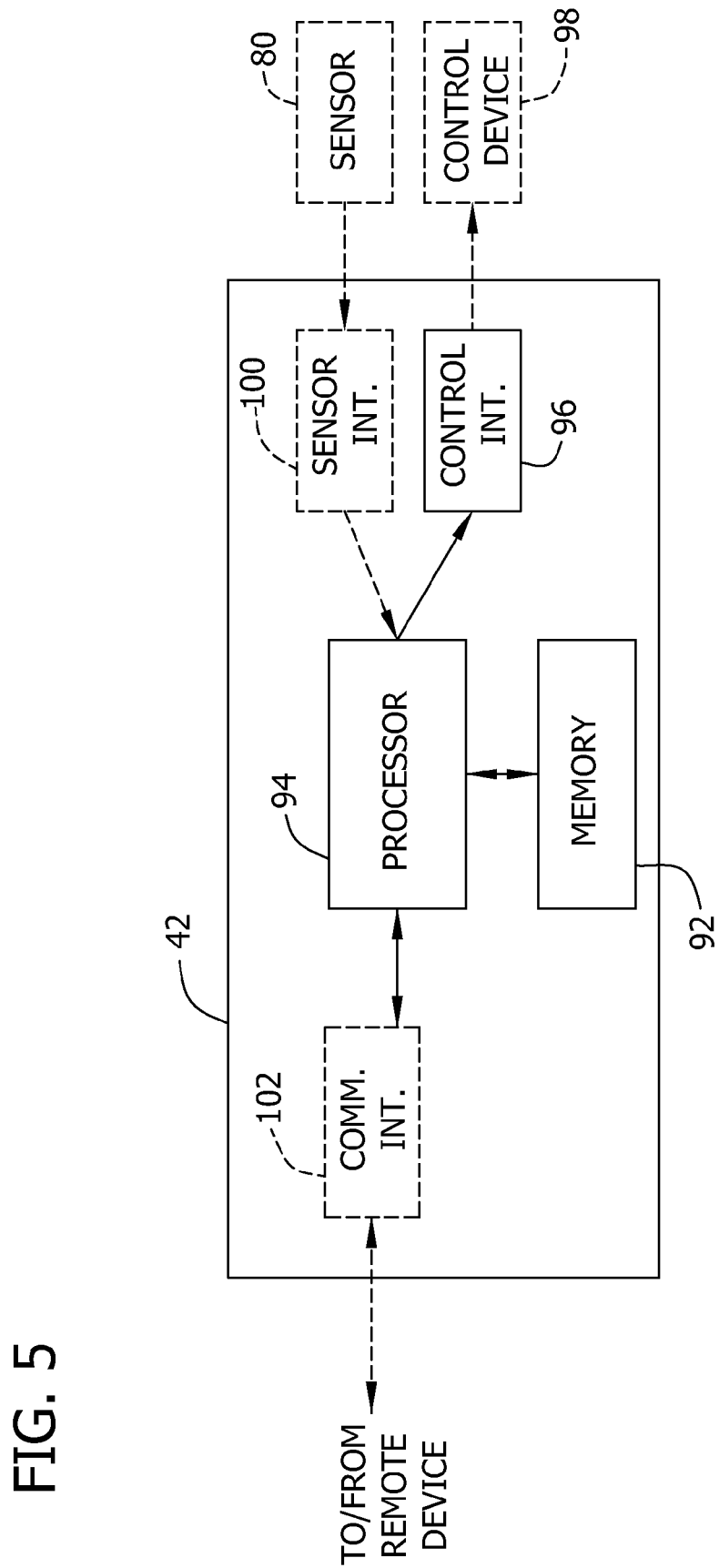
FIG. 5 is a block diagram illustrating an exemplary control system suitable for use with the rotor blade condition monitoring system shown in FIG. 3.

FIG. 5 is a block diagram illustrating an exemplary control system 42. In the exemplary embodiment, control system 42 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, control system 42 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring at a substantially short period of time after a change in the inputs affect the outcome, with the time period being a design parameter that may be selected based on the importance of the outcome and/or the capability of the system processing the inputs to generate the outcome.

In the exemplary embodiment, control system 42 includes a memory area 92 configured to store executable instructions and/or one or more operating parameters representing and/or indicating an operating condition of rotor blade 28. Operating parameters may represent and/or indicate, without limitation, a vibration frequency, a temperature, a rotational velocity, a wind speed, and/or a wind direction. In one embodiment, memory area 92 is configured to store a predefined range of operating vibration frequency values that are received from user computing device 88. The predefined range of operating vibration frequencies includes vibration frequencies wherein rotor blade 28 operates without being subjected to an increase in load stresses and/or fatigue cycles. In the exemplary embodiment, control system 42 further includes a processor 94 that is coupled to memory area 92 and is programmed to calculate a condition of rotor blade 28 based at least in part on one or more operating parameters. For example, processor 94 may be programmed to calculate a condition of rotor blade 28 based on the predefined range of operating vibration frequency values. Alternatively, processor 94 may be programmed to calculate a range of operating vibration frequency values based, at least in part on a plurality of sensed vibrations received from sensor 80 over a period of operation of wind turbine 10. In one embodiment, processor 94 may include a processing unit, such as, without limitation, an integrated circuit (IC), an application specific integrated circuit (ASIC), a microcomputer, a programmable logic controller (PLC), and/or any other programmable circuit. Alternatively, processor 94 may include multiple processing units (e.g., in a multi-core configuration).

In the exemplary embodiment, processor 94 is programmed to compare a sensed vibration received from sensor 80 to the calculated range of operating vibration frequency values and/or the predefined range of operating vibration frequency values. Processor 94 is further programmed to determine that a condition of rotor blade 28 is below the predefined rotor blade condition if the sensed vibration is not within the calculated range of operating vibration frequency values and/or the predefined range of operating vibration frequency values.

Control system 42 also includes a control interface 96 that is configured to control an operation of wind turbine 10 based at least in part on a calculated condition of rotor blade 28. In some embodiments, control interface 96 is operatively coupled to one or more wind turbine control devices 98 for example, pitch adjustment system 38 (shown in FIG. 2).

In the exemplary embodiment, control system 42 includes a sensor interface 100 that is coupled to at least one sensor 80 for receiving one or more signals from sensor 80. Each sensor 80 generates and transmits a signal corresponding to a sensed vibration of rotor blade 28. Moreover, each sensor 80 may transmit a signal continuously, periodically, or only once, for example, though other signal timings are also contemplated. Furthermore, each sensor 80 may transmit a signal either in an analog form or in a digital form. Control system 42 processes the signal(s) by processor 94 to create one or more operating parameters, including, without limitation, vibration frequency values. In some embodiments, processor 94 is programmed (e.g., with executable instructions in memory area 92) to sample a signal produced by sensor 80. For example, processor 94 may receive a continuous signal from sensor 80 and, in response, calculate a range of operating vibration frequency values based on the continuous signal periodically (e.g., once every five seconds). In some embodiments, processor 94 normalizes a signal received from sensor 80. For example, sensor 80 may produce an analog signal with a parameter (e.g., voltage) that is directly proportional to a vibration frequency value. Processor 94 may be programmed to convert the analog signal to the vibration parameter. In one embodiment, sensor interface 100 includes an analog-to-digital converter that converts an analog voltage signal generated by sensor 80 to a multi-bit digital signal usable by control system 42.

In some embodiments, control system 42 includes a communication interface 102. Communication interface 102 is configured to be coupled in communication with one or more remote devices, such as user computing device 88. Communication interface 102 may be configured to transmit an operating parameter and/or a control parameter (e.g., a pitch angle value) to a remote device. For example, communication interface 102 may be configured to encode an operating parameter and/or a control parameter in a signal. In addition, or alternatively, communication interface 102 may be configured to receive the operating parameter and/or the control parameter from a remote device and control an operation of wind turbine 10 based at least in part on the received operating parameter and/or control parameter.

Various connections are available between control interface 96 and control device 98 and between sensor interface 100 and sensor 80. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside wind turbine 10) network connection, whether wired or wireless.

Figure 6:
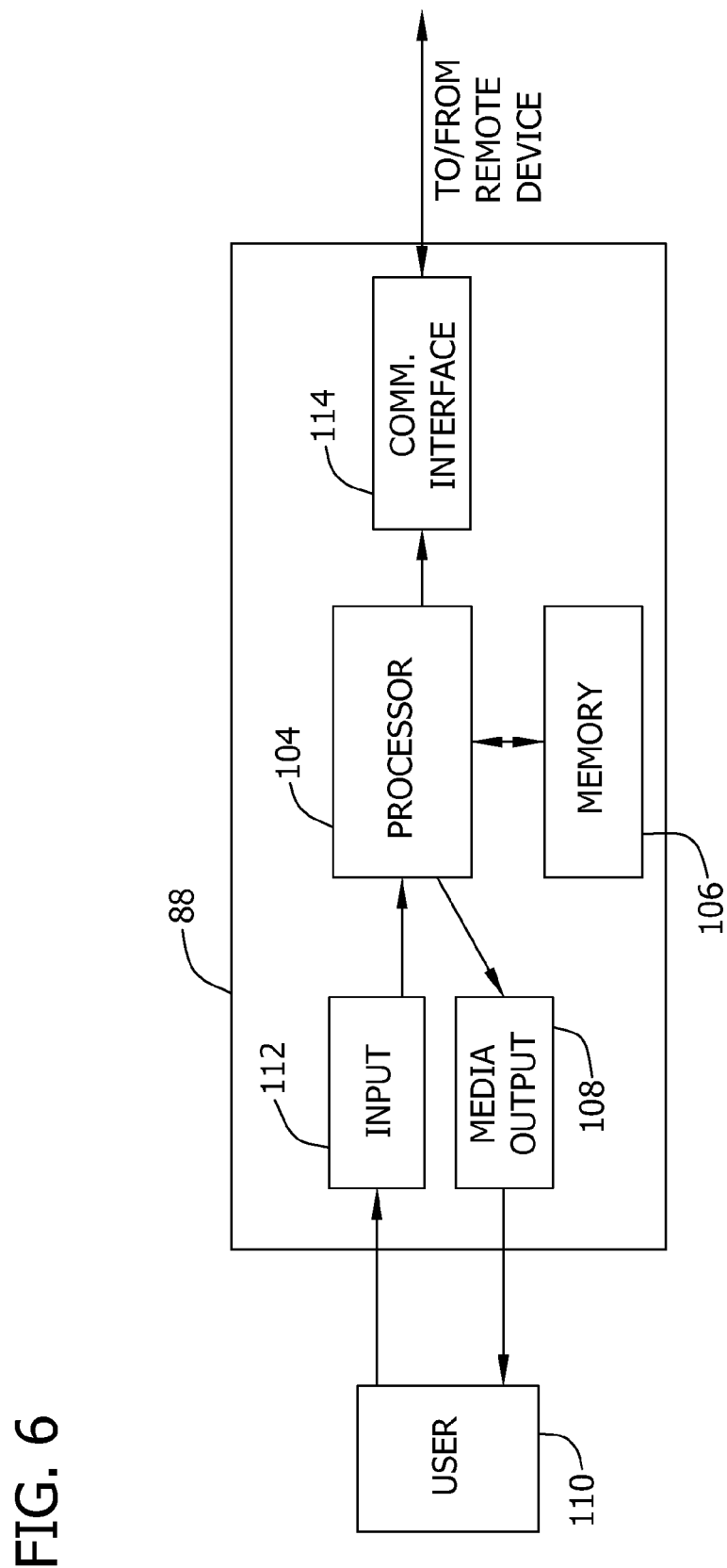
FIG. 6 is a block diagram illustrating an exemplary user computing device suitable for use with the rotor blade condition monitoring system shown in FIG. 3.

FIG. 6 is a block diagram illustrating an exemplary user computing device 88. User computing device 88 includes a processor 104 for executing instructions. In some embodiments, executable instructions are stored in a memory area 106. Processor 104 may include one or more processing units (e.g., in a multi-core configuration). Memory area 106 is any device allowing information, such as executable instructions and/or other data, to be stored and retrieved.

User computing device 88 also includes at least one media output component 108 for presenting information to a user 110. Media output component 108 is any component capable of conveying information to user 110. Media output component 108 may include, without limitation, a display device (e.g., a liquid crystal display (LCD), an organic light emitting diode (OLED) display, or an audio output device (e.g., a speaker or headphones).

In some embodiments, user computing device 88 includes an input device 112 for receiving input from user 110. Input device 112 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of media output component 108 and input device 112. User computing device 88 also includes a communication interface 114, which is configured to be communicatively coupled to network 90 and/or rotor blade condition monitoring system 40.

During operation of wind turbine 10, control system 42 is configured to transmit a notification signal to user computing device 88 upon determining that the condition of rotor blade 28 is less than the predefined rotor blade condition. User computing device 88 is configured to display a notification to user 110 with media output component 108 upon receiving the notification signal from control system 42. In an alternative embodiment, control system 42 is configured to operate pitch adjustment system 38 to modulate a pitch angle of rotor blade 28 to adjust a vibration frequency of rotor blade 28 upon determining that the condition of rotor blade 28 is less than the predefined rotor blade condition. In another alternative embodiment, control system 42 is configured to control pitch adjustment system 38 in response to a determined condition of rotor blade 28 to move rotor blade 28 to a feathered position to facilitate a stall of rotor 22.

FIG. 7 is a flow chart illustrating an exemplary method 200 of monitoring a condition of rotor blade 28. In the exemplary embodiment, method 200 includes transmitting 202, by sensor 80 to control system 42, at least one monitoring signal indicative of a vibration of rotor blade 28 to control system 42. Control system 42 calculates 204 a condition of rotor blade 28 based on the monitoring signal, and compares 206 the calculated condition with a predefined rotor blade condition. Control system 42 transmits 208 a notification signal to user computing device 88 upon determining 210 that the condition of rotor blade 28 is different than a predefined rotor blade condition.

An exemplary technical effect of the methods, system, and apparatus described herein includes at least one of: (a) transmitting, from a sensor to a control system, at least one monitoring signal indicative of a vibration of a rotor blade; (b) calculating a condition of the rotor blade based on the monitoring signal; (c) comparing the calculated condition with a predefined rotor blade condition; and (d) transmitting a notification signal from the control system to a remote device upon determining the calculated condition is different than a predefined rotor blade condition.

The above-described systems and methods facilitate monitoring the condition of a rotor blade used with a wind turbine. More specifically, a rotor blade condition monitoring system facilitates sensing a vibration of a rotor blade and determining the condition of the rotor blade based on the sensed vibrations. Further, the system described herein operates the wind turbine in a safety operation upon determining that the condition of the rotor blade is different than a predefined rotor blade condition. As such, the damage that can occur to a rotor blade and/or a wind turbine during operation is facilitated to be reduced or eliminated, thereby extending the operational life of a wind turbine.

Exemplary embodiments of systems and methods for monitoring a condition of a rotor blade used with a wind turbine are described above in detail. The systems and methods are not limited to the specific embodiments described herein, but rather, components of the systems and/or steps of the methods may be utilized independently and separately from other components and/or steps described herein. For example, the methods may also be used in combination with turbine monitoring systems, and are not limited to practice with only the wind turbine systems as described herein. Rather, the exemplary embodiment can be implemented and utilized in connection with many other turbine monitoring applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for monitoring a condition of a rotor blade of a wind turbine, said method comprising:
   transmitting, from a plurality of sensors to a controller, at least one monitoring signal indicative of a vibration of the rotor blade, wherein the plurality of sensors includes a first sensor coupled to a support frame of the wind turbine for monitoring the vibration of the rotor blade;
   calculating, by the controller, a range of operating vibration frequency values indicative of a normal operation of the rotor blade based at least in part on the monitoring signal;
   calculating, the condition of the rotor blade based on the monitoring signal; and,
   determining the calculated condition of the rotor blade to be less than a predefined condition when a sensed vibration frequency is different than the calculated range of operating vibration frequency values.

2. A method in accordance with claim 1, further comprising transmitting a notification signal from the controller to a user computing device upon determining that the calculated rotor blade condition is less than the predefined rotor blade condition.

3. A method in accordance with claim 1, wherein the wind turbine includes a pitch drive system coupled to the rotor blade to adjust a pitch of the rotor blade, said method further comprises adjusting the pitch of the rotor blade such that the sensed vibration frequency is within the calculated range of operating vibration frequency values upon determining that the calculated rotor blade condition is less than the predefined rotor blade condition.

4. A method in accordance with claim 1, wherein the wind turbine includes a pitch drive system coupled to the rotor blade to adjust a pitch of the rotor blade, said method further comprises rotating the rotor blade to a feathered position upon determining that the calculated rotor blade condition is less than the predefined rotor blade condition.

5. A method in accordance with claim 1, wherein the plurality of sensors includes a second sensor coupled to a hub of the wind turbine, said method further comprises transmitting, from the second sensor to the controller, at least one monitoring signal indicative of a vibration of the hub to facilitate monitoring a vibration of the rotor blade.

6. A method in accordance with claim 1, wherein the plurality of sensors includes a second sensor coupled to a rotor shaft of the wind turbine, said method further comprises transmitting, from the second sensor to the controller, at least one monitoring signal indicative of a vibration of the rotor shaft to facilitate monitoring a vibration of the rotor blade.

7. A rotor blade condition monitoring system for use with a wind turbine, the wind turbine including at least one rotor blade, said rotor blade condition monitoring system comprising:
   a plurality of sensors configured to sense a vibration of the rotor blade and to transmit at least one monitoring signal indicative of the sensed vibration, said plurality of sensors comprising a first sensor coupled to a support frame of the wind turbine for monitoring the vibration of the rotor blade; and,
   a controller communicatively coupled to said sensor for receiving the monitoring signal from said sensor, said controller configured to:

calculate a range of operating vibration frequency values indicative of a normal operation of the rotor blade based at least in part on the monitoring signal; and, determine a condition of the rotor blade to be less than a predefined condition when a sensed vibration frequency is different than the calculated range of operating vibration frequency values.

8. A rotor blade condition monitoring system in accordance with claim 7, wherein said controller is configured to transmit a notification signal to a user computing device upon determining that the rotor blade condition is less than the predefined rotor blade condition.

9. A rotor blade condition monitoring system in accordance with claim 7, wherein the wind turbine includes a pitch drive system coupled to the rotor blade, said controller is configured to operate the pitch drive system to adjust the pitch of the rotor blade such that the sensed vibration frequency is within the calculated range of operating vibration frequency values upon determining that the calculated rotor blade condition is less than the predefined rotor blade condition.

10. A rotor blade condition monitoring system in accordance with claim 7, wherein said plurality of sensors further comprises a second sensor mountable to a hub of the wind turbine for monitoring the vibration of the rotor blade.

11. A rotor blade condition monitoring system in accordance with claim 7, wherein said plurality of sensors further comprises a second sensor mountable to a drivetrain of the wind turbine for monitoring a vibration of the rotor blade.

12. A rotor blade condition monitoring system in accordance with claim 7, wherein said plurality of sensors further comprises a second sensor mountable to at least one of a rotor flange, a main support bearing, and a rotor shaft of the wind turbine for monitoring a vibration of the rotor blade.

13. A rotor blade condition monitoring system in accordance with claim 7, wherein said first sensor is one of a proximity sensor and an acceleration sensor.

14. A rotor blade condition monitoring system in accordance with claim 7, wherein the wind turbine includes a pitch drive system coupled to the rotor blade, said controller configured to operate the pitch drive system to rotate the rotor blade to a feathered position upon determining that the condition of the rotor blade is less than the predefined condition of the rotor blade.

15. A wind turbine, comprising:
a tower;
a nacelle coupled to said tower;
a generator positioned within said nacelle;
a rotor;
a rotor shaft rotatably coupling said rotor to said generator;
at least one rotor blade coupled to said rotor;
a pitch drive system coupled to said rotor blade; and,
a rotor blade condition monitoring system comprising:
    a plurality of sensors configured to sense a vibration of the rotor blade, said sensor further configured to transmit at least one monitoring signal indicative of the sensed vibration, said plurality of sensors comprising a first sensor coupled to a support frame of the wind turbine for monitoring the vibration of the rotor blade; and,
    a controller communicatively coupled to said sensor for receiving the monitoring signal from said sensor, said controller configured to:
    calculate a range of operating vibration frequency values indicative of a normal operation of the rotor blade based at least in part on the monitoring signal; and,
    determine a condition of the rotor blade to be less than a predefined condition when a sensed vibration frequency is different than the calculated range of operating vibration frequency values.

16. A wind turbine in accordance with claim 15, wherein said controller is configured to transmit a notification signal to a user computing device upon determining that the rotor blade condition is less than the predefined rotor blade condition.

17. A wind turbine in accordance with claim 16, wherein said controller is configured to operate the pitch drive system to adjust the pitch of the rotor blade such that the sensed vibration frequency is within the calculated range of operating vibration frequency values upon determining that the calculated rotor blade condition is less than the predefined rotor blade condition.

18. A wind turbine in accordance with claim 15, wherein said plurality of sensors further comprises a second sensor mountable to a hub of the wind turbine for monitoring a vibration of said rotor blade.

19. A wind turbine in accordance with claim 15, wherein said plurality of sensors further comprises a second sensor mountable to at least one of a rotor flange, a main support bearing, and said rotor shaft of said wind turbine for monitoring a vibration of said rotor blade.

20. A wind turbine in accordance with claim 15, wherein said controller is configured to operate the pitch drive system to rotate the rotor blade to a feathered position upon determining that the condition of the rotor blade is less than a predefined condition of the rotor blade.

* * * * *